United States Patent
Wang

(10) Patent No.: US 7,672,539 B2
(45) Date of Patent: Mar. 2, 2010

(54) METHOD AND APPARATUS FOR SCALING SELECTED AREAS OF A GRAPHICS DISPLAY

(75) Inventor: Yeqing Wang, Horsham, PA (US)

(73) Assignee: General Instrument Corporation, Horsham, PA (US)

( * ) Notice: Subject to any disclaimer, the term of this patent is extended or adjusted under 35 U.S.C. 154(b) by 866 days.

(21) Appl. No.: 11/300,907

(22) Filed: Dec. 15, 2005

(65) Prior Publication Data

US 2007/0140593 A1    Jun. 21, 2007

(51) Int. Cl.
| | |
|---|---|
| G06K 9/34 | (2006.01) |
| G06K 9/46 | (2006.01) |
| G06K 9/66 | (2006.01) |
| G06K 9/36 | (2006.01) |
| G06K 9/32 | (2006.01) |
| H04N 5/262 | (2006.01) |
| H04N 7/01 | (2006.01) |
| H04N 11/20 | (2006.01) |

(52) U.S. Cl. ............... 382/284; 382/176; 382/195; 382/298; 348/240.3; 348/445

(58) Field of Classification Search ............ 348/240.33, 348/240.02, 445, 240.2
See application file for complete search history.

(56) References Cited

U.S. PATENT DOCUMENTS

| | | | | |
|---|---|---|---|---|
| 4,808,987 A * | 2/1989 | Takeda et al. | ............... | 345/667 |
| 6,157,736 A * | 12/2000 | Jodoin et al. | ............... | 382/173 |
| 6,393,150 B1 * | 5/2002 | Lee et al. | ............... | 382/176 |
| 6,698,026 B2 * | 3/2004 | Schweer | ............... | 2/94 |
| 7,292,264 B2 * | 11/2007 | Itokawa | ............... | 348/143 |
| 7,483,592 B2 * | 1/2009 | Weiss et al. | ............... | 382/298 |
| 2002/0054115 A1 * | 5/2002 | Mack et al. | ............... | 345/765 |
| 2002/0130970 A1 * | 9/2002 | Jiang | ............... | 348/459 |
| 2003/0002739 A1 * | 1/2003 | Loce et al. | ............... | 382/216 |
| 2003/0021476 A1 * | 1/2003 | Di Federico et al. | ........ | 382/176 |
| 2003/0091237 A1 * | 5/2003 | Cohen-Solal et al. | ....... | 382/204 |
| 2003/0133612 A1 * | 7/2003 | Fan | ............... | 382/199 |
| 2004/0213466 A1 * | 10/2004 | Kodama et al. | ............. | 382/232 |
| 2005/0207675 A1 * | 9/2005 | Fuchigami et al. | .......... | 382/298 |

* cited by examiner

*Primary Examiner*—Bhavesh M Mehta
*Assistant Examiner*—Nathan Bloom
(74) *Attorney, Agent, or Firm*—Larry T. Cullen

(57) ABSTRACT

A method (30) and apparatus (10) for scaling selected areas of a graphics display. The method (30) includes removing distortion-sensitive information from the graphics display, scaling or converting the format of the distortion-nonsensitive information, such as from one aspect ratio to another, and then compositing the removed distortion-sensitive information with the scaled distortion-sensitive information. Alternatively, the removed distortion-sensitive is scaled, distortion-free, before combining it with the scaled distortion-nonsensitive information. The apparatus (10) uses a recognition comparator (16) to identify distortion-sensitive information, a graphics remover (18) to remove the distortion-sensitive information, a first scaler (22) to scale the distortion-nonsensitive information, a second scaler to provide distortion-free scaling of the distortion-sensitive information, and a compositer (26) to combine the distortion-sensitive information with the scaled distortion-nonsensitive information. A graphics display can be converted using a conversion process that introduces distortion, yet distortion-sensitive information, such as logos, are not subject to such distortion.

15 Claims, 2 Drawing Sheets

METHOD AND APPARATUS FOR SCALING SELECTED AREAS OF A GRAPHICS DISPLAY

BACKGROUND OF THE INVENTION

1. Field of the Invention

The invention relates to graphics for display. More particularly, the invention relates to methods and apparatus for scaling graphics display information.

2. Description of the Related Art

The aspect ratio of graphics displayed on a device, such as a television, is a numerical expression of the width to height of the graphics display. For standard television display format, e.g., National Television System Committee (NTSC) and Phase Alternation Line (PAL), the aspect ratio is 4:3, i.e., a "4" unit width corresponding to a "3" unit height, proportionally, regardless of the actual size of the screen. For wide screen digital television (DTV) formats for high definition television (HDTV) and some enhanced definition television (EDTV) formats, the aspect ratio is wider: 16:9, i.e., a "16" unit width corresponding to a "9" unit height, proportionally, regardless of the actual size of the screen.

Since there exists both graphics content meant for display on devices with a 4:3 aspect ratio and graphics content meant for display on devices with a 16:9 aspect ratio, content providers and service providers often are faced with the task of providing graphics in both aspect ratio formats or converting graphics between different aspect ratios. Conventional methods for converting graphics typically require that a portion of the converted graphics information for display be removed or cut off. Some conventional conversion methods use linear conversion techniques to fill out the final display window or screen, however such methods introduce distortion to the graphics. Moreover, distortion often is more pronounced with distortion-sensitive graphics information, such as logos, than it is with graphics information that is not as distortion-sensitive, such as text. Yet, conventional conversion techniques typically apply the same type or amount of aspect ratio conversion to all parts of the same graphics display information.

DETAILED DESCRIPTION

Figure 1:
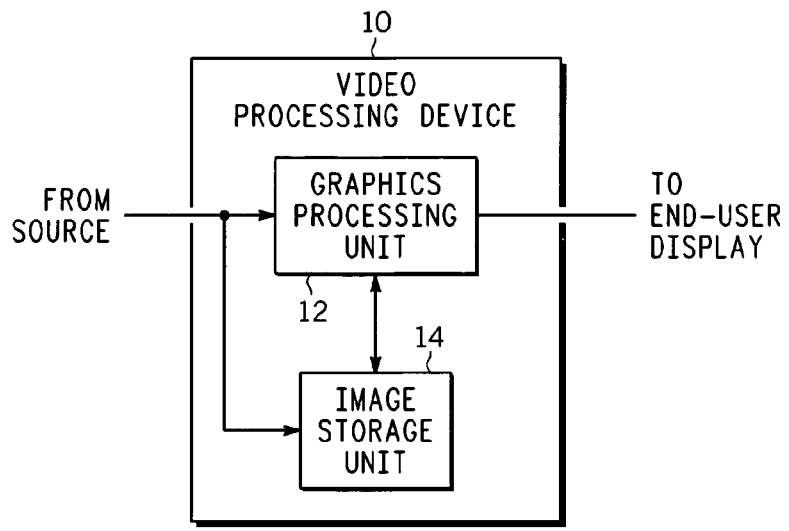
FIG. 1 is a block diagram of an apparatus for use in scaling selected areas of a graphics display.

In the following description, like reference numerals indicate like components to enhance the understanding of the graphics scaling method and apparatus through the description of the drawings. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

Despite the many available methods and apparatus available to convert graphics information between various formats, e.g., between 4:3 and 16:9 aspect ratios, conversion of graphics information from one aspect ratio to another often results in some distortion of the graphics content. Since many viewers of graphics displays are accustomed to viewing and reading different text fonts, a reasonable amount of distortion due to aspect ratio conversion can be tolerated by the viewer. Such graphics content or information generally can be described as non-sensitive to distortion, or distortion-nonsensitive. However, graphics viewers, as well as graphics content providers and advertisers, often are very sensitive to the distortion of other graphics content, e.g., logos and other graphic images. Such graphics content or information generally can be described as distortion-sensitive content or distortion-sensitive information.

As discussed previously herein, most aspect ratio conversion methods and devices use linear conversion techniques, which typically convert all portions of the graphics display in the same manner to fill out the final display window or screen. That is, for purposes of aspect ratio conversion and other format conversion, such methods and devices do not differentiate between different areas or portions of the graphics display or different types of graphics information.

Referring now to FIG. 1, shown is a block diagram of an apparatus or device 10 for use in scaling selected areas of a graphics display. The apparatus 10 can be completely or partially any suitable device or subsystem (or portion thereof) for receiving and/or processing video/graphic information, such as any signal converter or decoder (set-top) box or other suitable computing device or video device, including a residential gateway, an internet protocol (IP), satellite or cable digital video recorder, a computer, or a home media server system.

The apparatus 10 includes a graphics processing unit 12 and an image storage unit 14, operably coupled together as shown. It should be understood that the apparatus 10 includes other components, hardware, and software (not shown) that are used for the normal operation of features and functions of the apparatus 10 not specifically described herein.

The apparatus 10 receives graphics information from an appropriate source (not shown) of graphics information, e.g., graphics information generated locally from a device, such as a set-top box, or remotely from a service provider of video stream content that includes graphics and/or graphics information. The service provider can be a television service provider (e.g., a national or local television network), a cable television service provider, an Internet service provider, a satellite broadcast system service provider, or other suitable service provider. The graphics processing unit 12 outputs information to an end-user display, which can be any suitable display device, such as a television or computer monitor.

The graphics processing unit 12 can be comprised of any suitable structure or arrangement, e.g., one or more integrated circuits. Alternatively, one or more of the components comprising the graphics processing unit 12 can be comprised of any suitable structure or arrangement, e.g., one or more integrated circuits. Also, alternatively, one or more of the elements comprising any one or more of the components comprising the graphics processing unit 12 can be comprised of any suitable structure or arrangement, e.g., one or more integrated circuits.

The graphics processing unit 12 can be completely or partially configured in the form of hardware circuitry and/or other hardware components within a larger device or group of components. Alternatively, the graphics processing unit 12 can be completely or partially configured in the form of software, e.g., as processing instructions or one or more sets of logic or computer code. In such configuration, the logic or processing instructions typically are stored in a data storage device (not shown), which typically is coupled to a processor or controller (not shown). The processor accesses the necessary instructions from the data storage device and executes the instructions or transfers the instructions to the appropriate location within the graphics processing unit 12.

The image storage unit 14 is any suitable information storage unit, such as any suitable magnetic or optical storage device, including magnetic disk drives, optical drives, tape drives, and memory devices including random access memory (RAM) devices, read-only memory (ROM) and Flash memory. Also, although the image storage unit 14 is shown within the apparatus 10, the image storage unit 14 can be located external to the apparatus 10.

Figure 2:
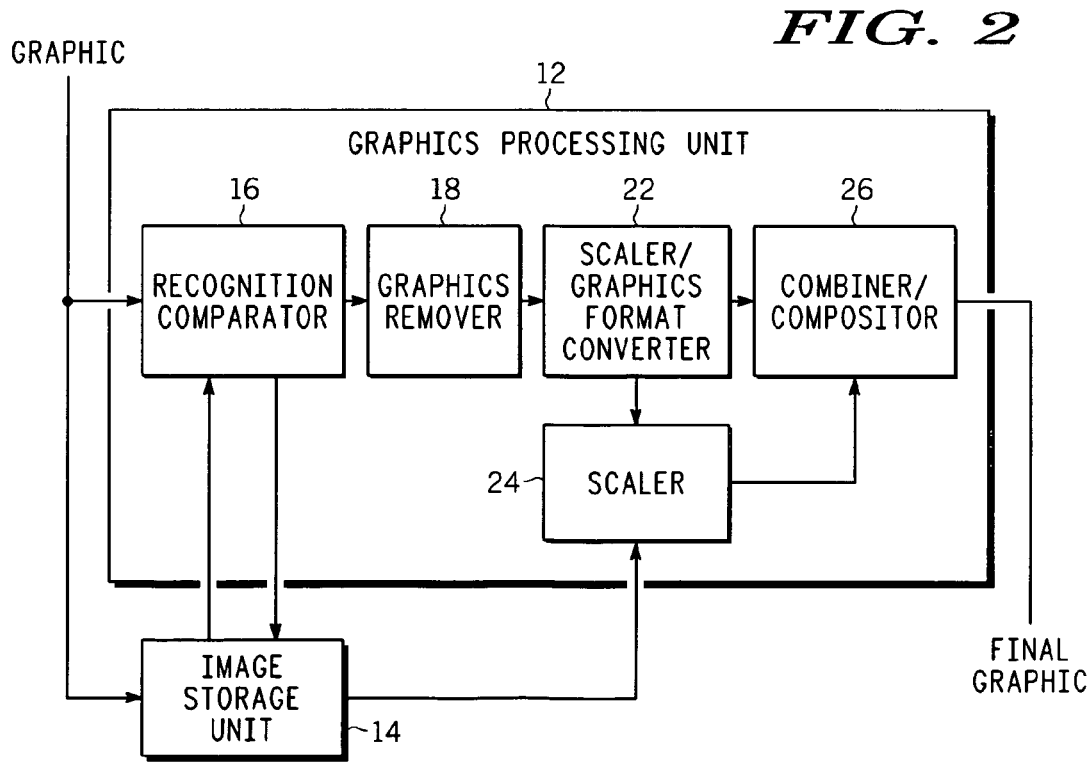
FIG. 2 is a block diagram of a graphics processing unit in the apparatus of FIG. 1.

Referring now to FIG. 2, with continuing reference to FIG. 1, shown is a block diagram of the graphics processing unit 12 shown in the apparatus 10 of FIG. 1. Also shown is the image storage unit 14. As discussed previously herein, the graphics processing unit 12 can be part of a set-top box or other suitable video signal processing device. The graphics processing unit 12 includes a comparator or recognition comparator 16, a graphics remover 18, a first scaler or graphics format converter 22, such as an aspect ratio converter, a second scaler 24, and a graphics combiner or compositer 26. The graphics processing unit 12 also includes other conventional components and hardware (not shown) suitable for other graphics processing operations not specifically described herein.

Figure 3:
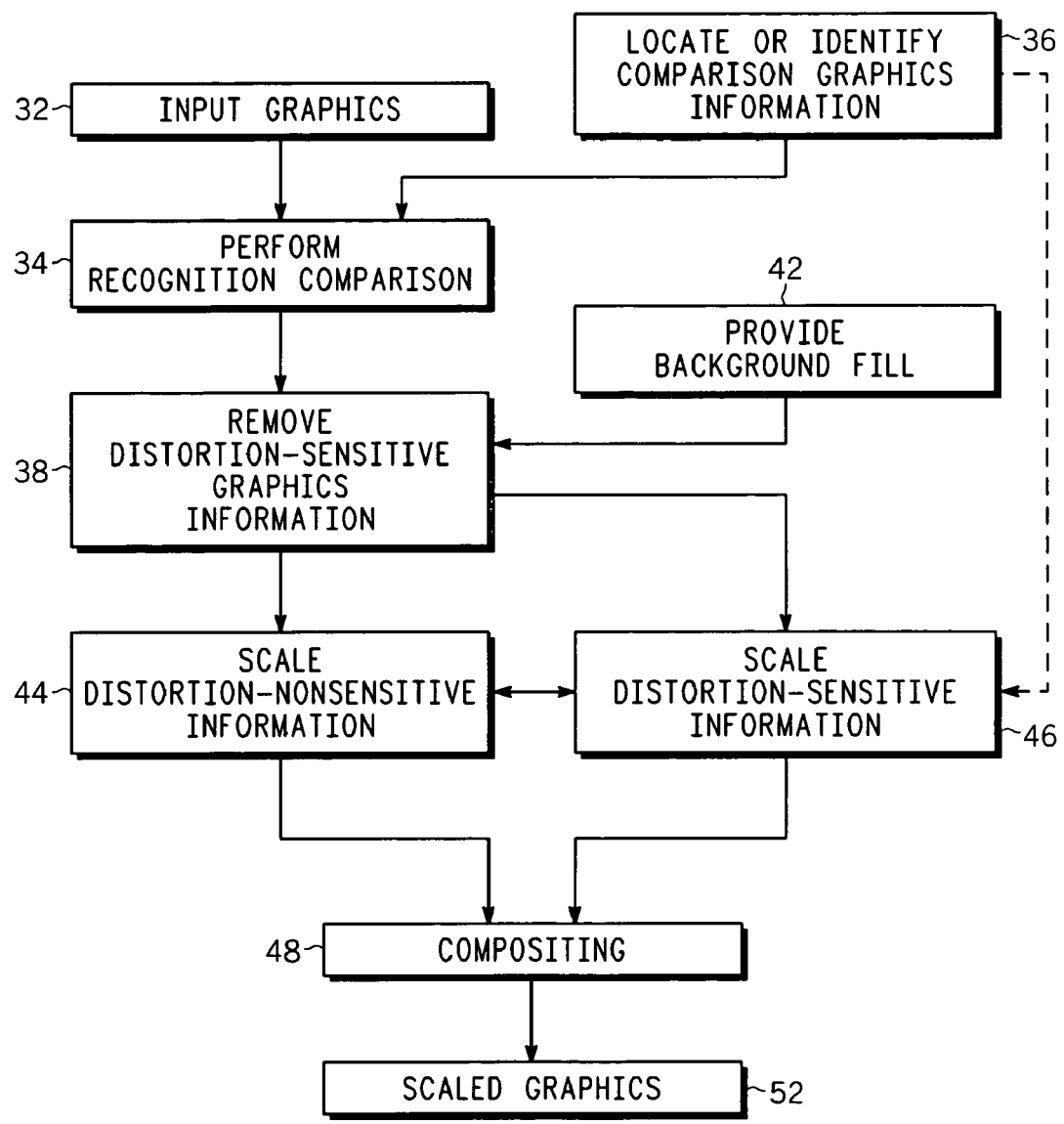
FIG. 3 is a block diagram of a method for scaling selected areas of a graphics display.

Referring now to FIG. 3, with continuing reference to FIGS. 1 and 2, shown is a method 30 for scaling selected areas of a graphics display. The method 30 will be described along with the operation of the apparatus 10 and the graphics processing unit 12. The method 30 includes the step 32 of inputting graphics or graphics information into the graphics processing unit 12. As discussed previously herein, the graphics information is input from a suitable source (not shown) that is operably connected to the apparatus 10. Alternatively, the graphics information is generated by the video processing device 10 and transferred to the graphics processing unit 12 by appropriate means.

Graphics information can be any information suitable for display on an end-user device, such as a television or computer monitor. For example, graphics information typically is text and/or image information (e.g., a logo) generated by a video processing unit, such as a set-top box, that is displayed on top of or along with video stream content received by the set-top box from a video content source, such as a video service provider. However, for purposes of discussion herein, graphics information also can be the video stream itself that is received by the set-top box from a video content source.

Typically, initiating one or more set-top box or other video processing device features will generate a graphics display on the screen of the end-user display device, e.g., a television. For example, in response to an end-user depressing an appropriate button on a remote control device used to operate the set-top box, the set-top box may generate graphics indicating programming choices that currently are available to the end-user, and prompt the end user to make an appropriate selection from among the available programming choices. Although such graphics typically are generated by the set-top box and initiated by the end-user of the set-top box, such graphics can be generated at any suitable location, e.g., the video stream source, by any suitable means, e.g., by the video content service provider, and transmitted to the video processing device 10 and the graphics processing unit 12 in any suitable manner, e.g., as in-band signaling and/or out-of-band signaling.

The method 30 includes the step 34 of performing a recognition comparison function. Once graphics information is received or is being received by the graphics processing unit 12, the recognition comparator 16 begins identifying which graphics information is distortion-sensitive graphics information. Alternatively, graphics identification can be the result of metadata encoded in one or more portions of any graphics information received or to be received by the graphics processing unit 12 of other appropriate component. As discussed hereinabove, distortion due to format conversion, such as aspect ratio conversion, often is more pronounced in certain types of graphics information, such as logos and other images or image-based graphics. As discussed previously herein, such graphics information is referred to as distortion-sensitive graphics information or distortion-sensitive information.

Other graphics information, such as some text and text-based graphics, is not as susceptible to distortion from format conversion, such as aspect ratio conversion, at least in the mind of an end-user viewing the information. Many end-users have become familiar with the many different types of texts and text fonts available. Thus, distortion due to format conversion in such information often is not noticed or at least does not appear as pronounced as distortion to distortion-sensitive information. As discussed previously herein, the graphics information that does not appear to suffer or suffer as much from format conversion distortion is referred to as distortion-nonsensitive graphics information or distortion-nonsensitive information.

In the recognition comparison step 34, the recognition comparator 16 identifies or determines which graphics information is distortion-sensitive graphics information. The graphics information that is not identified as distortion-sensitive information is, at least for purposes of the method 30, distortion-nonsensitive graphics information. Recognition comparison is performed, e.g., by comparing the general shape of graphics information received by the graphics processing unit 12 with image information from the image storage unit 14 or, in the case of metadata, by reading the metadata information encoded in the graphics information. For example, the general shape of logos and/or other graphics information is compared to that of the image information from the image storage unit 14. Positive recognition can be achieved from an exact match or even a less than exact match of the general shapes of the graphics information and those of the image information from the image storage unit 14.

To perform recognition comparison, the method 30 includes the step 36 of locating or identifying the image information to be used for recognition comparison. The image information contained within the image storage unit 14 can be prestored image information. For example, upon initial startup of the video processing device 10, the image storage unit 14 initially can receive images or image information to be used to compare with subsequently received graphics information. Alternatively, the image storage unit 14 subsequently can receive images or image information for comparative use. Such image information includes images that desirably are not to be distorted during any type of video conversion process, i.e., images of distortion-sensitive graphics information. This image information is stored in the image storage unit 14 for subsequent recognition comparison.

Alternatively, the image information in the image storage unit 14 can be obtained in real time, i.e., as the graphics information from the graphics source is being received by the recognition comparator 16. That is, the graphics information input into the recognition comparator 16 by the graphics information source also can be input into the image storage unit 14, as shown in FIG. 2. In such arrangement, the image storage unit 14 identifies images and image information that have been marked or otherwise identified as images or image information that are not to be distorted during any image conversion process of the graphics information. The image storage unit 14 can use such images for immediate recognition comparison, as well as store the images for subsequent recognition comparison.

The recognition comparison step 34 is performed in any suitable image comparison manner. For example, the recognition comparator 16 can scan and compare all of the received graphics information with the images in the image storage unit 14. Alternatively, the recognition comparator 16 can perform zoned image recognition.

Zoned image recognition involves targeting selected display areas of the graphics information for comparison with the images in the image storage unit 14. For example, if many of the logos that appear on the screen in response to initiating a graphics display of available set-top box features appear in the upper left portion of the television screen, the recognition comparator 16 can be configured to concentrate its recognition comparison efforts on the graphics information that ultimately will be displayed in that area of the end-user display device. In this manner, zoned image recognition can more efficiently identify distortion-sensitive graphics information by reducing the amount of scanning required to identify distortion-sensitive graphics information.

The method 30 can include the step 38 of removing the distortion-sensitive graphics information from the graphics information received by the recognition comparator 16. Once the recognition comparison step 34 identifies or determines the distortion-sensitive information from among the graphics information received by the recognition comparator 16, the graphics remover 18 removes such information from the received graphics information. For example, the graphics remover 18 removes the logo that otherwise would appear in the upper left corner of the graphics displayed by the graphics information. The distortion-sensitive graphics information removal step 38 is performed by any suitable process, including conventional graphics or logo removal processes. The remaining graphics information therefore is distortion-nonsensitive graphics information, or at least is to be treated as distortion-nonsensitive graphics information.

As part of the removal step 38, various information about the distortion-sensitive graphics information is recorded, including but not limited to position, color, format and alpha (transparency effect). Also, a graphic bitmap or other type of graphic image of the distortion-sensitive graphics information can be recorded. Because of this recorded information, the graphics processing unit 12 knows, among other things, where in the graphics display the distortion-sensitive graphics information was removed. Such position will provide the graphics processing unit 12 with the necessary position information to later add the distortion-sensitive graphics information back into the graphics information once the graphics information has been scaled or converted, as will be discussed in greater detail hereinbelow.

The method 30 also includes the step 42 of providing a background fill for the portion of the distortion-sensitive graphics that was removed from the graphics information. Once the distortion-sensitive graphics information has been removed from the graphics information, the removed portion of the graphics information is replaced in the graphics information with image-neutral distortion-nonsensitive graphics information. Image-neutral distortion-nonsensitive graphics information is the type of graphics information that does not contain images or other distortion-sensitive graphics information (i.e., image-neutral) and is not sensitive to distortion caused by format conversion (i.e., distortion-nonsensitive).

Typically, image-neutral distortion-nonsensitive graphics information is the type of graphics information that provides a background fill for the portion of the graphics information that is missing by the removal of the distortion-sensitive graphics information. For example, the removed portion of the graphics information is filled with background color/pattern the same as the background color/pattern of the remaining portion of the graphics information, often by interpolating the areas of the graphics information near the original location of the removed distortion-sensitive graphics.

The background fill step 42 is performed by the graphics remover 18. Alternatively, the background fill step 42 is performed by any other suitable component (not shown) or processing instruction, either within the graphics remover 18 or external to the graphics remover 18. By removing the distortion-sensitive graphics information and replacing it with image-neutral distortion-nonsensitive graphics information, the graphics information now contains only distortion-nonsensitive graphics information.

Alternatively, depending on the distortion-sensitive graphics information and the background fill, the method 30 performs the background fill step 42 without performing the distortion-sensitive graphics information removal step 38. In this manner, the background color/pattern is put on top of the distortion-sensitive go, effectively covering up the distortion-sensitive graphics information instead of actually removing the distortion-sensitive graphics information.

The method 30 also includes the step 44 of scaling the distortion-nonsensitive graphics information. Once the distortion-sensitive graphics information has been removed and replaced with a background fill or graphics information that is displayed as a background filler, the (first) scaler/graphics format converter 22 scales the graphics information using a first scaling algorithm. Since distortion-sensitive graphics information has been removed and replaced with image-neutral distortion-nonsensitive graphics information, all of the graphics information, at this point, essentially is distortion-nonsensitive graphics information. Therefore, to scale or convert the format of the graphics information, e.g., to convert from a first aspect ratio to a second aspect ratio, the scaler/graphics format converter 22 can use any suitable format conversion. The results of the scaling step 44 produce scaled or format-converted distortion-nonsensitive graphics information.

As discussed hereinabove, conventional converters, such as aspect ratio converters, use linear conversion processes for a conversion that often is not linear, resulting in some distortion to the graphics information. However, since the graphics information at this point is distortion-nonsensitive graphics information, any distortion that is introduced as a result of the format conversion is not noticeable to an end-user or at least can be tolerated by the end-user. Thus, the scaling step 44 can use any suitable format conversion or aspect ratio conversion process.

The method 30 also includes the step 46 of scaling the distortion-sensitive graphics information. After the distortion-sensitive graphics information is removed from the graphics information, the second scaler 24 can scale the distortion-sensitive graphics information, using a second scaling algorithm, to produce scaled distortion-sensitive graphics information.

The second scaler 24 scales the distortion-sensitive graphics information using any suitable distortion-free scaling process. Since the distortion-sensitive graphics information is sensitive to any scaling process that would introduce distortion, the second scaling algorithm and the scaling process involved must be such that the distortion-sensitive graphics information is not distorted. Thus, at least in this sense, the second scaling algorithm is different than the first scaling algorithm, which was used to by the scaler/graphics format converter 22 to scale the distortion-nonsensitive graphics information.

However, because the scaled distortion-sensitive graphics information is to be combined with the scaled distortion-nonsensitive graphics information, the second scaling algorithm should be based on or take into consideration the first scaling algorithm. In this manner, the distortion-sensitive graphics information can be scaled, distortion-free, but proportionally to the scaling or aspect ratio conversion of the distortion-nonsensitive graphics information.

Alternatively, the scaling step 46 does not scale the distortion-sensitive graphics information that was removed from the distortion-sensitive graphics information removal step 38. Rather, the scaling step 46 can use the image information in the image storage unit 14 that matched the distortion-sensitive graphics information that was removed from the graphics information. As discussed previously herein, the image information in the image storage unit 14 can be prestored or extracted in real time as the graphics information is being fed to both the 16 and the image storage unit 14. Also, it should be understood that multiple versions of the image information can be included in the image storage unit 14, including different-sized versions of the same or similar image information.

For example, if a particular logo contained in the graphics information received by the graphics processing unit 12 matches a prestored logo, the second scaler 24 can scale the prestored logo (or a copied version of the prestored logo) using the second scaling algorithm. In this manner, during the recognition comparison step 34, when distortion-sensitive graphics information is found to match image information in the image storage unit 14, the distortion-sensitive graphics information is removed from the graphics information (removal step 38) and the matching image information in the image storage unit 14 is tagged or otherwise noted for subsequent scaling by the second scaler 24 during the scaling step 46.

However, no matter which distortion-sensitive graphics information is used for scaling, the second scaler 24 performs the scaling step 46 in such a manner that the distortion-sensitive graphics information is scaled without distortion. The result of the scaling step 46 is scaled distortion-sensitive graphics information.

The method also includes the step 48 of compositing the scaled distortion-sensitive graphics information with the scaled distortion-nonsensitive graphics information. Compositing is a conventional process in which different portions of a graphics image display are combined. The graphics combiner or compositer 26 performs the compositing step 48 to replace or reinsert the previously-removed distortion-sensitive graphics information into the graphics information from which it was removed (step 38). However, according to the method 30, the distortion-nonsensitive graphics information has been scaled or format converted, e.g., converted from one aspect ratio to another aspect ratio. Also, the distortion-sensitive graphics information typically also has been scaled, but in a linear manner or in a manner that does not distort the distortion-sensitive graphics information.

Therefore, in this manner, the graphics information that is not as sensitive to distortion can be converted from one aspect ratio to another, e.g., in a conventional manner, regardless of whether the conversion introduces distortion. Yet, the information that typically would suffer the most from distortion, such as logos or other image-based graphics, can be resized in a manner proportional to the aspect ratio conversion, but without the distortion that is introduced by many conventional aspect ratio conversion processes. Therefore, the portion of the graphics information that would suffer the most from distortion is not distorted, yet all of the graphics information is effectively format converted, e.g., from one aspect ratio to another aspect ratio.

Part of the compositing step 48 includes recalculating the position of the scaled distortion-sensitive graphics information before combining it with the scaled distortion-nonsensitive graphics information. As discussed previously herein, during the distortion-sensitive graphics information removal step 38, the initial position of the distortion-sensitive graphics information in the overall graphics display was recorded or otherwise noted. Based on this position, along with the first and second scaling algorithms, the combiner 26 can determine the new position of the scaled distortion-sensitive graphics information when compositing the scaled distortion-sensitive graphics information with the scaled distortion-nonsensitive graphics information. Thus, for a logo, based on its initial position within the display, and based on the amount of scaling to the logo and the display from which it was removed, the logo can be reinserted into the display in the same relative position, with the same relative scaling, but without any distortion that otherwise may have been caused by a conventional format conversion process, such as aspect ratio conversion.

Alternatively, the distortion-sensitive graphics information does not have to be scaled before combining it with the scaled distortion-nonsensitive graphics information. That is, the method 30 can be performed without the second scaler 24 performing the scaling step 46. However, depending on the scaling algorithm used to convert the format of the distortion-nonsensitive graphics information, the distortion-sensitive graphics information may not look proportional to the scaled distortion-nonsensitive graphics information when the distortion-sensitive graphics information is composited with the scaled distortion-nonsensitive graphics information. That is, depending on the amount of scaling applied to the distortion-nonsensitive graphics information, once combined, the non-scaled logo or other distortion-sensitive graphics information may look too large or too small compared to the overall graphics display, depending on whether the format conversion increased or decreased the underlying distortion-nonsensitive graphics information.

Once the compositing step 48 has been performed, the method 30 produces 52 scaled graphics information without distortion to the logos or other distortion-sensitive graphics information.

The method shown in FIG. 3 may be implemented in a general, multi-purpose or single purpose processor. Such a processor will execute instructions, either at the assembly, compiled or machine-level, to perform that process. Those instructions can be written by one of ordinary skill in the art following the description of FIG. 3 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the graphics scaling method and apparatus herein described without departing from the spirit and scope of the invention as defined by the appended claims and their full scope of equivalents.

This invention claimed is:

1. A method for scaling a graphics image, the graphics image including distortion-sensitive graphics information and distortion-nonsensitive graphics information, comprising:

receiving graphics information from a source;

analyzing said graphics information so as to identify distortion-sensitive graphics information and distortion-nonsensitive graphics information;

separating, by using a comparator, the distortion-sensitive graphics information from the distortion-nonsensitive graphics information;

scaling, by using a first scaler, the distortion-nonsensitive graphics information using a first scaling algorithm to produce scaled distortion-nonsensitive graphics information;

scaling, by using a second scaler, the distortion-sensitive graphics information using a second scaling algorithm to produce scaled distortion-sensitive graphics information, wherein the first scaling algorithm is different than the second scaling algorithm;

compositing the scaled distortion-nonsensitive graphics information and the scaled distortion-sensitive graphics information to produce a scaled graphics image, wherein said compositing the scaled distortion-nonsensitive graphics information and the scaled distortion-sensitive graphics information further comprises replacing the scaled distortion-sensitive graphics information into the scaled graphics image;

displaying said scaled graphics image on a display; and determining a new position for the scaled distortion-sensitive graphics information within the scaled graphics image, wherein determining the new position for the distortion-sensitive graphics information is based on a comparison of the first and second scaling algorithms.

2. The method as recited in claim 1, wherein separating the distortion-sensitive graphics information from the distortion-nonsensitive graphics information further comprises removing the distortion-sensitive graphics information from the graphics image.

3. The method as recited in claim 2, further comprising determining the relative position of the distortion-sensitive graphics information within the graphics image.

4. The method as recited in claim 1, wherein scaling the distortion-nonsensitive graphics information includes replacing the distortion-sensitive graphics information with image-neutral distortion-nonsensitive graphics information.

5. The method as recited in claim 1, wherein separating the distortion-sensitive graphics information from the distortion-nonsensitive graphics information includes comparing portions of the graphics image to at least one pre-stored graphics image.

6. A method for converting graphics information from a first aspect ratio to a second aspect ratio, the graphics information including at least one distortion-sensitive graphics information portion and one distortion-nonsensitive graphics information portion, comprising:

receiving said graphics information from a source;

analyzing said graphics information so as to identify said distortion-sensitive graphics information portion and said distortion-nonsensitive graphics information portion;

separating, by using a comparator, the distortion-sensitive graphics information portion from the distortion-nonsensitive graphics information portion;

removing the distortion-sensitive graphics information portion from the graphics information;

converting, by using a scaler, the distortion-nonsensitive graphics information from the first aspect ratio to the second aspect ratio;

replacing the distortion-sensitive graphics information portion into the graphics information having the second aspect ratio so as to generate composite graphic information; and displaying said composite graphic information on a display, wherein:

said replacing the distortion-sensitive graphics information portion into the graphics information having the second aspect ratio includes determining a new position for the distortion-sensitive graphics information portion, and said determining the new position for the distortion-sensitive graphics information portion of the graphics information is based on the conversion of the distortion-nonsensitive graphics information portion from the first aspect ratio to the second aspect ratio.

7. The method as recited in claim 6, wherein converting the distortion-nonsensitive portion of the graphics information further comprises scaling the distortion-nonsensitive portion of the graphics information using a first scaling algorithm.

8. The method as recited in claim 7, further comprising scaling the distortion-sensitive portion of the graphics information using a second scaling algorithm, wherein the second scaling algorithm is different from the first scaling algorithm.

9. The method as recited in claim 6, wherein removing the distortion-sensitive graphics information portion from the graphics information includes replacing the removed distortion-sensitive graphics information portion with image-neutral distortion-nonsensitive graphics information.

10. The method as recited in claim 6, wherein identifying the distortion-sensitive portion of the graphics information further comprises comparing the graphics information to at least one pre-stored graphics image.

11. An apparatus for scaling graphics information, the graphics information including distortion-sensitive graphics information and distortion-nonsensitive graphics information, comprising:

an input for receiving graphics information;

a comparator for analyzing said graphics information so as to identify said distortion-sensitive graphics information and said distortion-nonsensitive graphics information;

a remover for removing the identified distortion-sensitive graphics information from the graphics information;

a first scaler for scaling the distortion-nonsensitive graphics information by a first scaling algorithm to produce scaled distortion-nonsensitive graphics information;

a second scaler for scaling the distortion-sensitive graphics information by a second scaling algorithm to produce scaled distortion-sensitive graphics information, wherein the second scaling algorithm is different from the first scaling algorithm;

a combiner for combining the scaled distortion-sensitive graphics information and the scaled distortion-nonsensitive graphics information to produce scaled graphics information, wherein the combiner is further configured to replace the scaled distortion-sensitive graphics information into the scaled graphics image;

a display for displaying said scaled graphics information; and an identifier for determining a new position for the scaled distortion-sensitive graphics information within the scaled graphics image, wherein the identifier determines the new position for the distortion-sensitive graphics information based on a comparison of the first and second scaling algorithms.

12. The apparatus as recited in claim 11, wherein at least a portion of the apparatus is contained in a video processing device.

13. The apparatus as recited in claim 12, wherein the video processing device is selected from the group consisting of a signal converter box, a signal decoder box, a digital video recorder, a computer, and a home media server.

14. The apparatus as recited in claim 11, wherein at least a portion of the apparatus further comprises an integrated circuit.

15. A computer program embodied in a computer-readable medium for scaling a graphics image, the graphics image including distortion-sensitive graphics information and distortion-nonsensitive graphics information, the program when executed causing a device to perform the steps of:

receiving graphics information from a source;

analyzing said graphics information so as to identify distortion-sensitive graphics information and distortion-nonsensitive graphics information;

separating the distortion-sensitive graphics information from the distortion-nonsensitive graphics information;

scaling the distortion-nonsensitive graphics information using a first scaling algorithm to produce scaled distortion-nonsensitive graphics information;

scaling the distortion-sensitive graphics information using a second scaling algorithm to produce scaled distortion-sensitive graphics information, wherein the first scaling algorithm is different than the second scaling algorithm;

compositing the scaled distortion-nonsensitive graphics information and the scaled distortion-sensitive graphics information to produce a scaled graphics image, wherein said compositing the scaled distortion-nonsensitive graphics information and the scaled distortion-sensitive graphics information further comprises replacing the scaled distortion-sensitive graphics information into the scaled graphics image;

displaying said scaled graphics image on a display; and determining a new position for the scaled distortion-sensitive graphics information within the scaled graphics image, wherein determining the new position for the distortion-sensitive graphics information is based on a comparison of the first and second scaling algorithms.

\* \* \* \* \*